Nov. 3, 1931.  P. BROSSE  1,830,637
SELECTOR FILTER
Filed Feb. 17, 1928
Fig.2.  Fig.1.  Fig.3.
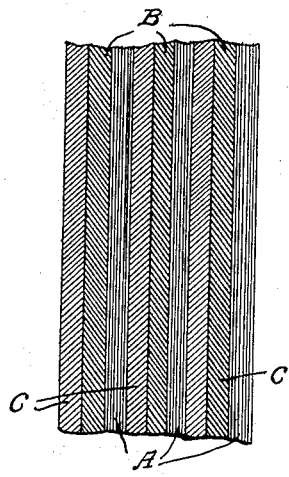
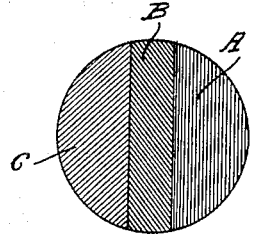
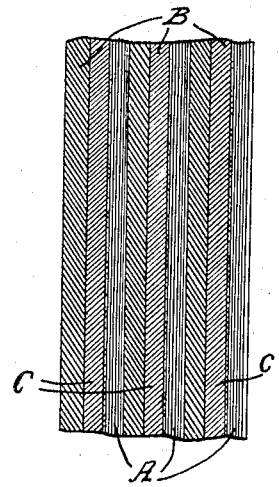
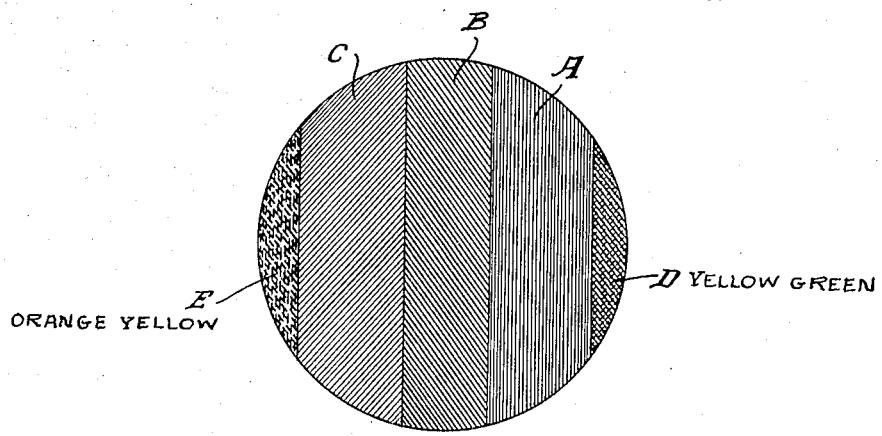
ORANGE YELLOW   D YELLOW GREEN
Fig. 4.
Inventor:
Paul Brosse
By
Attorney.

Patented Nov. 3, 1931

1,830,637

UNITED STATES PATENT OFFICE

PAUL BROSSE, OF NEUILLY, FRANCE, ASSIGNOR, BY MESNE ASSIGNMENTS, TO KISLYN CORPORATION, OF NEW YORK, N. Y., A CORPORATION OF DELAWARE

SELECTOR FILTER

Application filed February 17, 1928, Serial No. 255,140, and in France July 22, 1927.

The object of this invention is to improve the selector filters used with films that are formed with microscopic refracting elements.

The following description and the accompanying diagrammatic drawings will enable the characteristics of the invention to be clearly understood.

In said drawings, Figure 1 is a view of an ordinary colour-selecting filter in which A, B and C indicate, respectively, the red, green and blue-violet zones; Fig. 2 is a view of the image—such as it should appear—of the trichrome filter of Fig. 1 corresponding to each striation of the goffered film; Fig. 3 is a view, on an enlarged scale, showing the image as it actually appears at the junction of two striations between the colours; and Fig. 4 is a view similar to Fig. 1, but showing a filter with five colour bands or zones.

It is well known that if a film provided with microscopic refracting elements is illuminated by means of a camera or lens provided in its nodal plane with a trichrome selector filter, each of said refracting elements will itself form a faithful image of the trichrome selector disk.

Considering, for instance, what takes place with a striated film the refracting elements of which are semi-cylindrical, when such a film is illuminated by means of a lens or camera provided with a trichrome filter such as the one shown in Figure 1, there should be seen (theoretically) through a microscope, behind every refracting element a coloured image such as the one shown in Figure 2. That is to say, each of the three zones, red A, green B, violet-blue C, of the trichrome filter should give three zones, red, green and violet-blue coloured, sharply defined and sharply separated behind each striation (Figure 2).

In practice, however, this is not the case. Microscopic examination will show the coloured zones behind each striation as indicated in Figure 3: where, as will be apparent, the green zone is always as sharply separated from the red zone A and from the violet-blue zone C as in Figure 2. On the contrary, at the junction point of two adjacent striations and along the ridge that separates them, the red zone A and the violet-blue zone C, while sharply separated at their junction with the green zone, penetrate into one another at their junction point. The result is a diffused zone which is a mixture of red and of violet-blue.

This overlapping involves a most awkward consequence when projecting films that are formed with refracting elements. There is found, as a matter of fact, at both edges of the projecting screen, on the right and on the left hand sides, a general dominating hue which, becoming more conspicuous from the center towards the edges, is rosy or reddish, produces a highly objectionable effect and falsifies the other colours projected in that region.

The improvement which is the object of my invention has for its purpose to cause these prevailing hues to disappear on projection by doing away with the overlapping of red over violet-blue at the junction point of two refracting elements.

For this purpose—both in picture-taking and in projection—the selector filter, as shown in Figure 4, no longer comprises three but five monochrome zones, i. e., three selector zones, red, green, violet-blue, plus two compensating zones, one of which, D, is yellow-green, and the other one, E, is orange-yellow. The yellow-green zone limits the red selector zone of the filter, those two colours being complemental; while the orange-yellow compensating zone limits the violet-blue selector zone, said two colours also being complemental.

Under the influence of the obliquity of the light beams that strike the striations bordering the image, the blue-violet zone tends to spread towards the red zone of the next striation and to become blended therewith.

But then the violet-blue from the edge of the selector filter becomes blended with the orange-yellow of the adjacent compensator filter and gives a neutral grey which will have no influence on the general colour of the projection screen.

The yellow-green compensator filter will act in the same way with respect to the red filter. In the portion where the red has a tendency to overlap the violet-blue from the next striation, said red becomes blended with its yellow-green compensator complemental and will form a neutral grey devoid of any influence on the bordering colour of the projection screen.

The above indicated colours are mentioned only as examples. With other colours used as selectors, the compensator filters will be differently coloured, but, in order to accomplish the desired purpose, the colours of the compensating filters must always be complemental of the selector colours which they are intended to meet and to neutralize.

Considering that what is desired is to do away with overlapping and with the effects thereof, the compensator colours might be reversed, that is to say the orange-yellow might be on the red side and the yellow-green on the violet-blue side. The result achieved would be the same, that is to say each of the compensating colours would, through overlapping its complemental, give a neutral grey devoid of influence on the colouring of the screen edges.

I claim as my invention:

1. A selecting filter for projecting goffered films in colours, having a set of differently-coloured selector zones occupying its central portion, and differently-coloured compensator zones at its opposite end portions; the colours of the compensator zones being complements of those of the selector zones which they touch so as to eliminate the noxious colours prevailing.

2. A filter according to claim 1, in which the selector zones are coloured red, green and violet-blue, in succession; and in which the compensator zones are coloured orange-yellow and yellow-green, respectively; the orange-yellow compensator zone touching the violet-blue selector zone, and the yellow-green compensator zone touching the red selector zone.

In testimony whereof I affix my signature.

PAUL BROSSE.